United States Patent [19]
Fujimura

[11] Patent Number: 5,397,073
[45] Date of Patent: Mar. 14, 1995

[54] SEAT BELT RETRACTOR HAVING A TIGHTENING EFFECT

[75] Inventor: Yoshiichi Fujimura, Echi, Japan

[73] Assignee: Takata Corporation, Tokyo, Japan

[21] Appl. No.: 950,665

[22] Filed: Sep. 25, 1992

[30] Foreign Application Priority Data

Sep. 30, 1991 [JP] Japan .................................. 3-250992

[51] Int. Cl.$^6$ ...................... B60R 22/34; B65H 75/08
[52] U.S. Cl. .................................. 242/376; 242/613.2
[58] Field of Search ........ 242/68.5, 107.4 A, 107.4 R, 242/107, 107.4 B, 107.4 C, 107.4 D, 107.4 E, 71.8, 107.2, 74, 376, 376.1, 610.3, 613.2, 613.4, 613.5

[56] References Cited

U.S. PATENT DOCUMENTS 4,266,740  5/1991  Ramos et al. ..................... 242/86.52
5,014,927  5/1992  Ogawa et al. ................. 242/68.5 X Primary Examiner—John M. Jillions
Attorney, Agent, or Firm—Armstrong, Westerman, Hattori, McLeland & Naughton

[57] ABSTRACT

In a seat belt retractor, cross-section of a reel shaft 4 is formed in octagonal cylinder, and each side of the octagon, i.e. outer peripheral surfaces 4b between corners 4a of the reel shaft 4 are formed in inwardly curved depression. Therefore, when a webbing 3 is taken up on the reel shaft 4, the webbing 3 is brought into contact only with the corners 4a of outer peripheral surfaces of the reel 4, and high compressive force f is intensively applied on the webbing 3 at the corners 4a of the reel shaft 4. As the result, high friction force is generated between the corners 4a and the webbing 3 and between the webbing coils at the corners 4a, and this prevents the pulling-out of the webbing 3. Thus, the pulling-out of the webbing due to tightening phenomenon can be prevented in reliable and satisfactory manner.

4 Claims, 2 Drawing Sheets

SEAT BELT RETRACTOR HAVING A TIGHTENING EFFECT

BACKGROUND OF THE INVENTION

The present invention relates to a seat belt retractor for preventing pulling-out of a webbing, which is wound on a reel shaft when the webbing is suddenly pulled out or when sudden acceleration occurs.

Conventionally, a seat belt unit is mounted on a seat in an automobile for protecting an occupant in an emergency such as vehicle collision. A webbing in such seat belt unit is wound on a reel shaft of an emergency locking type retractor unit, which is mounted on a reinforced member of the vehicle. When an occupant puts the webbing on, the webbing can be freely pulled out from the retractor unit in normal case so that the occupant is not restrained from moving. On the other hand, when an emergency such as vehicle collision occurs, reel shaft locking means of the retractor unit is operated by detecting impact force or sudden acceleration, and rotation of the reel shaft, which takes up the webbing, is locked. By this locking of the rotation of the reel shaft, the webbing restrains and protects the occupant by hindering him or her from sudden moving.

The reel shaft locking means can reliably stop the rotation of the reel shaft itself, which takes up the webbing. In some cases, however, the webbing taken up in excess on the reel shaft is pulled out by tightening phenomenon even when the rotation of the reel shaft is stopped. To prevent the pulling-out of the webbing by the tightening, a seat belt retractor as shown in FIG. 2 and FIG. 3 has been proposed.

As shown in FIG. 2 and FIG. 3, the seat belt retractor 1 comprises a cylindrical reel shaft 4 rotatably mounted on a frame 2 and for taking up a webbing 3, a pendulum 5 mounted on the frame 2 and tilted when an impact force higher than a predetermined value is applied, a ratchet coaxially fixed on the reel shaft 4 for taking up the webbing 3, a link 7 operated by tilting of the pendulum 5, thereby engaging a pawl 7a with tooth 6a of the ratchet 6 and moved upward by rotating force of the ratchet 6, and a stopper member 9 mounted on the frame 2 and moved by upward movement of the link 7 and squeezing the webbing 3 between itself and a receiving member 8 fixed on the frame 2. A webbing squeezing mechanism is formed by the link 7, the receiving member 8 and the stopper member 9.

In the seat belt retractor 1 with such arrangement, the pendulum 5 is tilted in an emergency, and the pawl 7a of the link 7 is moved to a position for engaging with the tooth 6a of the ratchet 6. As the webbing 3 is pulled out, the reel shaft 4 and the ratchet 6 are rotated. By the rotation of the ratchet 6, the tooth 6a of the ratchet 6 is engaged with the pawl 7a of the link 7, and the link is moved upward. By the upward movement of the link 7, the stopper member 9 is rotated upward, and the webbing 3 is squeezed between the stopper member 9 and the receiving member 8. As the result, pulling out of the webbing 3 due to tightening can be prevented.

However, the webbing squeezing mechanism in a conventional type seat belt retractor 1 comprises a link 7, a receiving member 8 and a stopper member 9, and the rotating force of the ratchet 6 is transmitted to the stopper member 9 through the link 7. As the result, the mechanism is very complicated, and many component parts are required. This makes the seat belt retractor 1 more complicated in structure and larger in size.

After performing various tests on the tightening phenomenon of the webbing 3, it has been found that the tightening is caused by:

(1) slipping between the webbing 3 and outer peripheral surface of the reel shaft 4, and slipping between the coils, and (2) elongation of the webbing 3 itself.

Above all, (1) is the major cause of the tightening phenomenon.

Describing the above conventional type seat belt retractor 1 in detail, cross-section of the reel shaft 4 is in circular or spiral form. When the webbing 3 is taken up on the reel shaft 4, the webbing 3 is wound on outer peripheral surface of the reel shaft 4 and over the entire outer peripheral surface of the webbing 3 of the previous turn by approximately uniform compressive force. Thus, the compressive force applied on the webbing 3 is almost uniformly dispersed on the entire surface of the webbing 3, and it is relatively low. As the result, it is very difficult to have high friction force between the webbing 3 and outer peripheral surface of the reel shaft 4, and between the webbing coils.

Therefore, the major cause for generating the above tightening, i.e. the cause (1) above, is present on the conventional type seat belt retractor 1. Thus, in the conventional type seat belt retractor 1, the pulling-out of the webbing 3 by the cause (1) is prevented by squeezing of the webbing 3 by means of the webbing squeezing mechanism. Specifically, in the conventional type seat belt retractor 1, the webbing squeezing mechanism for preventing the webbing 3 from pulling out due to tightening is essential and indispensable, while the above webbing squeezing mechanism causes problems as already described.

SUMMARY OF THE INVENTION

It is an object of the present invention to provide a seat belt retractor, by which it is possible to eliminate the need of the webbing squeezing mechanism to simplify the structure of the seat belt retractor, to reduce the number of component parts, and to prevent the pulling-out of the webbing due to tightening in reliable and satisfactory manner.

To attain the above object, the seat belt retractor of the present invention comprises at least a reel shaft for taking up and winding up the webbing so that it can be pulled out, and it is characterized in that cross-section of outer peripheral surface of said reel shaft is formed in polygonal shape.

The present invention is also characterized in that outer peripheral surfaces of said reel shaft between corners of said polygon are depressed inwardly.

Further, the present invention is characterized in that corners of said polygon are rounded.

In the seat belt retractor of the present invention with the above arrangement, cross-section of outer peripheral surface of the reel shaft is in polygonal shape. Thus, when the webbing is taken up on the reel shaft, high compressive force is intensively applied on the webbing at each corner of the polygon of the reel shaft. As the result, high friction force is generated between each corner of the reel shaft and the webbing and between the webbing and the webbing at each corner, and this prevents the slipping between the reel shaft and the webbing and between the webbing and the webbing. As the result, the webbing is prevented from pulling out. In the present invention, therefore, there is no need to furnish the webbing squeezing mechanism as in the conventional type unit, and the pulling-out of the webbing due to tightening phenomenon can be prevented in reliable and satisfactory manner.

In the present invention, the webbing is brought into contact only with the corners of the polygon of the reel shaft. Because the compressive force is applied intensively on the portion of the webbing corresponding to each corner of the reel shaft, the compressive force is very high.

Further, because the corners of the reel shaft are rounded in the present invention, even when corners are formed on outer peripheral surface of the reel shaft, the webbing is prevented from damage by these corners.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE PREFERRED EMBODIMENT

In the following, description will be given on an embodiment of the present invention in connection with the drawings.

Figure 1:
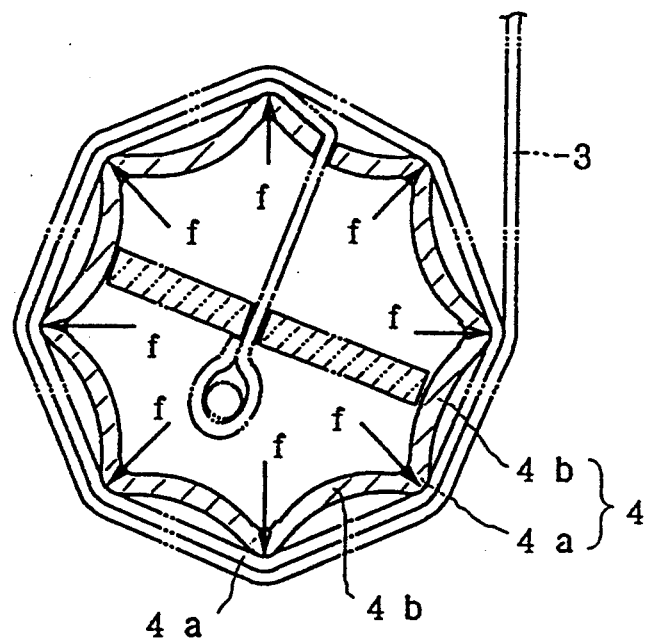
FIG. 1 is a cross-sectional view of a reel shaft used in an embodiment of a seat belt retractor of the present invention.
Figure 2:
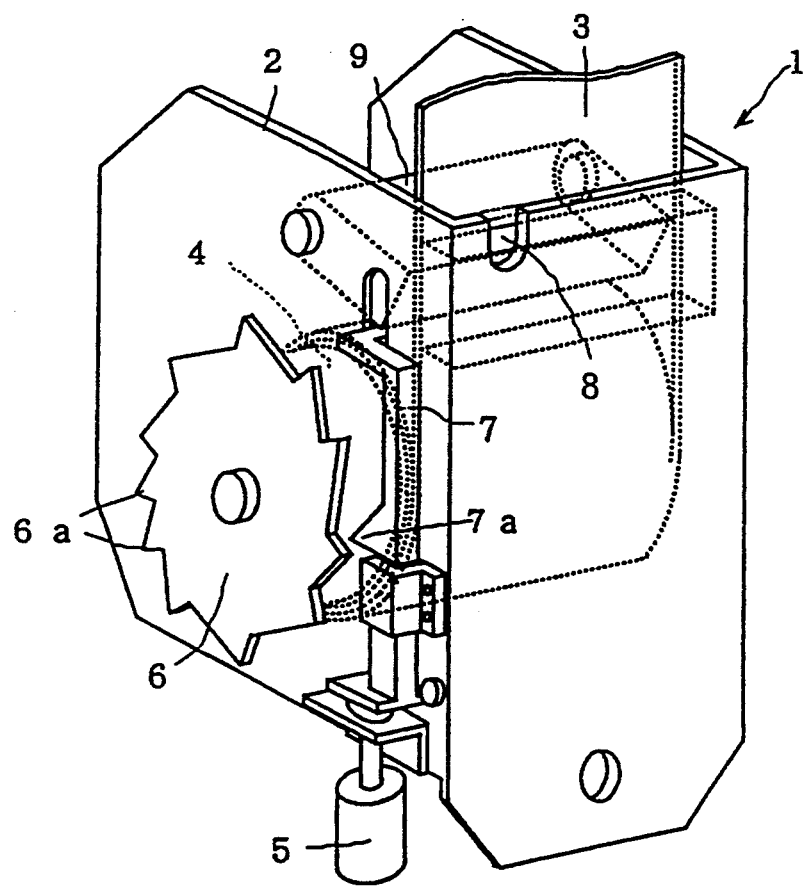
FIG. 2 is a perspective view of a conventional type seat belt retractor.
Figure 3:
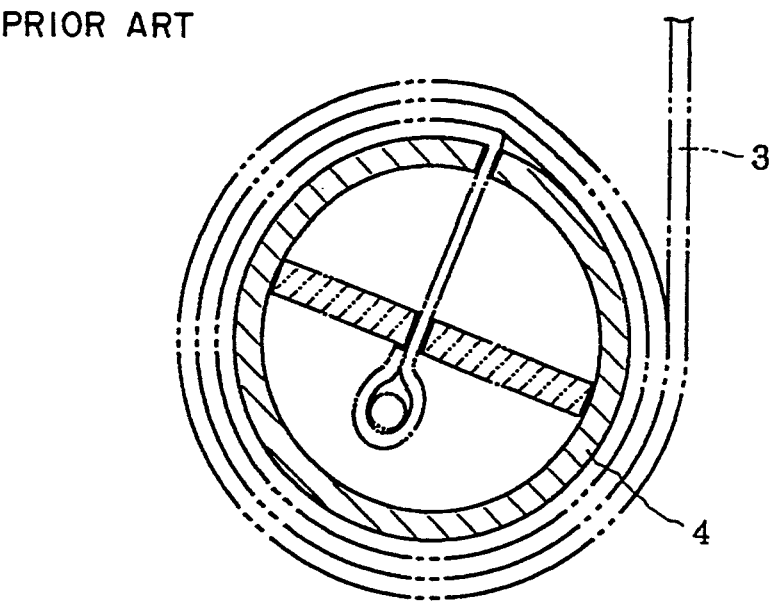
FIG. 3 is a cross-sectional view of a reel shaft used in the conventional type seat belt retractor.

As shown in FIG. 1, a reel shaft 4 used on a seat belt retractor of the present embodiment has cross-section in form of octagonal cylinder. Each side of the octagon, i.e. outer peripheral surfaces 4b between corners 4a of the reel shaft 4 are formed in inwardly curved depression. Each corner 4a has rounded R portion.

In a reel shaft 4 with such arrangement, cross-section of the reel shaft 4 is in form of an octagon, each side of which has inwardly curved depression. Thus, when the webbing 3 is taken up on the reel shaft 4, the webbing 3 is brought into contact only with the corners 4a on outer peripheral surfaces of the reel shaft 4. Therefore, when the rotation of the reel shaft 4 is locked by reel shaft locking means of the retractor unit in an emergency such as vehicle collision, compressive force generated by pulling force of the webbing 3 is intensively applied between the corners 4a of the reel shaft 4 and the webbing 3 on outermost periphery corresponding to the corners 4a. As the result, high friction force is generated between the corners 4a of the reel shaft 4 and the webbing 3 and between the webbing 3 and the webbing 3 at the corners 4a, giving the so-called drum chuck effect. This perfectly prevents slipping between the reel shaft 4 and the webbing 3 and between the webbing coils, thus blocking pulling-out of the webbing 3. Accordingly, it is possible to reduce the pulling-out amount of the webbing 3 during an emergency and to protect the occupant in reliable manner.

As described above, the webbing squeezing mechanism as used in the conventional type seat belt retractor is not necessarily needed when the reel shaft 4 of the present embodiment is used. This contributes to more simplified structure of the seat belt retractor and to the reduction of the number of component parts. However, it is also possible to provide both the reel shaft 4 of the present embodiment and the conventional type webbing squeezing mechanism at the same time. By this simultaneous use of the two devices, the pulling-out of the webbing due to tightening phenomenon can be prevented in more reliable manner.

Because the reel shaft 4 of the present embodiment has rounded corners 4a, damage of the webbing 3 by the corners 4a can be avoided even though the corners 4a are formed on outer periphery of the reel shaft 4.

The other actions and effects of the seat belt retractor 1 of the present embodiment are almost the same as those of the conventional type seat belt retractors including the above seat belt retractor, and the detailed description is not given here.

In the above embodiment, the cross-section of the reel shaft 4 is in form of an octagon, although the present invention is not limited to this, and it may have a cross-section in other polygonal forms. Also, curved depressions are formed on outer peripheral surfaces 4b between the corners 4a of the reel shaft 4 in the above embodiment, although the depressions may be formed as a bent surface or as a simple flat plane. However, it is preferable that the reel shaft 4 has depression on outer peripheral surface 4b between the corners 4a of the reel shaft 4 because higher compressive force f is intensively applied on the webbing 3 and pulling-out of the webbing 3 can be prevented more perfectly.

As it is evident from the above description, it is possible according to the seat belt retractor of the present invention to prevent the pulling-out of the webbing due to tightening phenomenon in perfect and reliable manner without requiring the webbing squeezing mechanism as in the conventional type unit. Therfore, the amount of pulling-out of the webbing can be reduced and the occupant in the vehicle can be more perfectly protected in an emergency. Because no webbing squeezing mechanism is required, the seat belt retractor can be designed in more simplified structure, and the number of component parts can be reduced.

What we claim is:

1. A seat belt retractor, comprising at least a reel shaft for taking up a webbing and for freely winding said webbing so as to be capable of being pulled out, wherein a cross-section of an outer peripheral surface of said reel shaft is in the form of a polygon, wherein said reel shaft is fully rigid, and wherein said outer peripheral surface of said reel shaft between corners of said polygon is depressed inwardly.

2. A seat belt retractor according to claim 1, wherein the corners of said polygon are rounded.

3. A seat belt retractor, comprising at least a reel shaft for taking up a webbing and for winding said webbing so as to be capable of being pulled out, wherein a cross-section of an outer peripheral surface of said reel shaft is in the form of a polygon, and wherein an inwardly depressed portion of said outer peripheral surface of said reel shaft between corners of said polygon has an aperture passing therethrough for allowing said webbing to originate from inside said reel shaft through said aperture and out of said reel shaft so as to be freely wound and capable of being pulled out.

4. A seat belt retractor according to claim 3, wherein said reel shaft is in the form of an octagon.

* * * * *